(12) United States Patent
Lu et al.

(10) Patent No.: US 8,048,305 B2
(45) Date of Patent: Nov. 1, 2011

(54) METHODS FOR SEPARATING AND ANALYZING ANIONIC COMPOUNDS

(75) Inventors: Ziling Lu, Hopkinton, MA (US); Diane Diehl, Ware, MA (US); Jeffrey Mazzeo, Auburn, MA (US); Stuart A. Oehrle, Cold Spring, KY (US); Claude R. Mallet, Attleboro, MA (US); Michael S. Young, Bellingham, MA (US); Erin Chambers, North Brookfield, MA (US)

(73) Assignee: Waters Technologies Corporation, Milford, MA (US)

( * ) Notice: Subject to any disclaimer, the term of this patent is extended or adjusted under 35 U.S.C. 154(b) by 979 days.

(21) Appl. No.: 11/944,728

(22) Filed: Nov. 26, 2007

(65) Prior Publication Data

US 2008/0169242 A1    Jul. 17, 2008

Related U.S. Application Data

(63) Continuation-in-part of application No. PCT/US2006/020385, filed on May 24, 2006.

(60) Provisional application No. 60/684,409, filed on May 24, 2005.

(51) Int. Cl.
*B01D 15/08*    (2006.01)

(52) U.S. Cl. .................. 210/635; 210/656; 210/198.2; 210/502.1

(58) Field of Classification Search ............. 210/656, 210/634, 635, 198.2, 502.1; 96/101; 502/402; 521/32, 33; 525/326.9, 330.3, 330.4, 330.5
See application file for complete search history.

(56) References Cited

U.S. PATENT DOCUMENTS

| | | | | |
|---|---|---|---|---|
| 2,788,331 A * | 4/1957 | Greer et al. | | 521/32 |
| 2,801,224 A * | 7/1957 | Greer | | 521/31 |
| 2,824,844 A * | 2/1958 | Gilwood | | 521/32 |
| 2,878,183 A | 3/1959 | Schuster et al. | | |
| 2,946,758 A * | 7/1960 | Zenftman | | 521/38 |
| 4,046,750 A * | 9/1977 | Rembaum | | 526/310 |
| 4,486,313 A * | 12/1984 | Meitzner et al. | | 210/681 |
| 5,028,696 A * | 7/1991 | Torres et al. | | 530/388.1 |
| 5,188,737 A * | 2/1993 | Sato et al. | | 210/638 |
| 6,616,825 B1 | 9/2003 | Frechet et al. | | |
| 6,750,340 B2 | 6/2004 | Padioukova et al. | | |
| 7,291,578 B2 * | 11/2007 | SenGupta et al. | | 502/402 |
| 7,731,844 B2 * | 6/2010 | Mallet et al. | | 210/198.2 |
| 7,875,186 B2 * | 1/2011 | Coppola et al. | | 210/677 |
| 2002/0004561 A1 * | 1/2002 | Takahashi et al. | | 525/326.9 |
| 2003/0042204 A1 * | 3/2003 | Idziak et al. | | 210/656 |
| 2004/0020857 A1 * | 2/2004 | Belew et al. | | 210/660 |
| 2004/0043072 A1 * | 3/2004 | Will et al. | | 424/486 |
| 2004/0079702 A1 * | 4/2004 | Johansson et al. | | 210/638 |
| 2004/0203149 A1 * | 10/2004 | Childs et al. | | 435/404 |
| 2005/0113343 A1 * | 5/2005 | Sienkiewicz et al. | | 514/102 |
| 2006/0013893 A1 * | 1/2006 | Stockel | | 424/601 |
| 2006/0035224 A1 * | 2/2006 | Johansen | | 435/6 |
| 2007/0003512 A1 * | 1/2007 | Stockel et al. | | 424/76.1 |
| 2008/0169241 A1 * | 7/2008 | Gottlieb et al. | | 210/668 |
| 2010/0300972 A1 * | 12/2010 | Mallet et al. | | 210/656 |

* cited by examiner

*Primary Examiner* — Ernest G Therkorn
(74) *Attorney, Agent, or Firm* — Proskauer Rose LLP

(57) ABSTRACT

Systems, methods and compositions for the purification, separation and analysis of anionic compounds, including polyanionic compounds are disclosed.

13 Claims, 4 Drawing Sheets

METHODS FOR SEPARATING AND ANALYZING ANIONIC COMPOUNDS

RELATED APPLICATIONS

This application is a continuation in part of, and claims priority to PCT/US2006/020385, filed May 24, 2006, which claims priority to U.S. Provisional Application No. 60/684,409, filed May 24, 2005; which applications are expressly incorporated herein in their entirety by this reference.

BACKGROUND OF THE INVENTION

Bisphosphonates, such as alendronate and risedronate, are used for the treatment and prevention of various diseases of bone metabolism. These analytes are very polar and multiply charged. Many other compounds of pharmaceutical or toxicological interest are also charged; such compounds are not well retained on most reversed-phased high pressure liquid chromatography (HPLC) columns, which makes analysis and purification difficult.

Currently, published chromatographic methods for the purification of bisphosphonates include ion pairing methods, derivatization, and ion exchange, with pre- or post-column treatments. Each of these methods has associated disadvantages, such as the incompatibility of certain solvents with mass spectrometric detection, use of harsh or potentially expensive reagents or the need for additional time-consuming work-up steps. Reported detection methods include conductivity, ultra-violet/visible detection, and fluorescence detection.

SUMMARY OF THE INVENTION

The embodiments of the present invention provides systems, methods, and compositions for the purification, separation and analysis of anionic compounds, including polyanionic compounds.

In one aspect, the invention provides a method for purifying an anionic compound, the method comprising contacting a mixture containing the anionic compound with a weak anion exchange solid phase under conditions such that the polyanionic compound is purified.

In preferred embodiments, the anionic compound is selected from the group consisting of phosphates, phosphonates, and carboxylates, nitrates, and sulfates. In more preferred embodiments, the anionic compound is a bisphosphonate compound selected from alendronate, risedronate, etidronate, pamidronate, zoledronate, ibandronate, and clodronate. In certain embodiments, the anionic compound is a polyanionic compound.

In certain embodiments, the weak anion exchange solid phase is an organic/inorganic hybrid material. In certain embodiments, the weak anion exchange solid phase is a polymer-based sorbent. In another embodiment, the polymer-based sorbent is a vinylpyrrolidone-based sorbent; optionally the vinylpyrrolidone-based sorbent further comprises piperazinyl pendant groups.

In one embodiment, the anionic compound is eluted from the weak anion exchange solid phase using a solvent; in certain embodiments, the solvent comprises an organic solvent.

In another embodiment, the weak anion exchange solid phase is a solid-phase extraction sorbent. In certain embodiments, the weak anion exchange solid phase is a packing for a liquid chromatographic column.

In certain embodiments, the method comprises the steps of: contacting the mixture containing the anionic compound with a weak anion exchange solid phase; separating at least one impurity from the anionic compound by eluting the impurity with a solvent having a first pH; separating at least one impurity from the anaionic compound by eluting the impurity with an organic solvent and eluting the anionic compound from the weak anion exchange solid phase with a solvent having a second pH; or eluting and derivatizing the anionic compound from the anion exchange solid phase with a solvent containing a derivatizing agent. An example of a derivatizing agent is TMZ-diazomethane.

In another aspect, the invention provides a method for analyzing a sample for the presence of an anionic compound, the method comprising the steps of: contacting a mixture containing the anionic compound with a weak anion exchange solid phase; eluting the anionic compound using a mobile phase; and detecting the presence of the anionic compound. One example of a solid phase is unbonded bridged aliphatic hybrid particles in 1.7 and 3.5 micron particles sizes for liquid chromatography and HILIC modes of operation. As used in this paper, the term hybrid refers to a particle having an inorganic and organic composition. A commercially available bridged aliphatic hybrid particle packed column is sold under the trademark AcQuity® HPLC® BEH column having an ethyl bridging moiety. This paper will refer to such columns as unbonded BEH columns.

In one embodiment, the detecting step comprises detecting the anionic compound using a mass spectrometer. In other embodiments, the mobile phase is substantially free of non-volatile salts. In still other embodiments, the mobile phase comprises an organic solvent.

In yet other embodiments, the mobile phase pH is adjusted in a gradient from low pH to high pH to elute the anionic compound from the weak anion exchange solid phase.

In one embodiment, an SPE method for the extraction of bisphosphonates from biological matrices using weak anion exchange without ion pairing or derivatization has been developed. Additionally, the first LC/MS/MS method for bisphosphonates without ion pairing or derivatization has been developed on an unbonded bridging aliphatic hybrid HPLC material, sold as a unbonded BEH column packed with 1.7 or 3.5 micron particles.

In another embodiment, a novel and simple LC/MS/MS method using a unbonded bridging aliphatic hybrid weak anion exchange HPLC packing material is provided. A gradient from low to high pH is used. The low pH starting gradient solution ensures that the analyte will be retained by ion exchange (i.e. the sorbent is charged). A pH gradient to high pH then "turns off" the ion exchange function and the analytes are eluted from the column. The mobile phase is fully MS compatible. The LC/MS/MS conditions have been optimized by experimenting with different starting gradient solutions and pHs, ending gradient solution elution strength, flow rates, and organic concentrations. Linear calibration curves have been obtained for LC/MS/MS analysis of risedronate over a concentration range of 0.5 to 100 ng/μL.

In another aspect the invention provides a simple and straightforward SPE method using a weak anion exchange SPE sorbent. The SPE method works for both aqueous and biological matrices. Recoveries are typically over 80%.

In still another aspect, the invention provides a method for detecting the presence or absence of phosphonate-based compounds, including chemical warfare agents, or degradation products thereof. The method includes the steps of contacting a sample which contains or may contain a chemical warfare agent, or at least one anionic degradation product thereof, with a weak anionic exchange solid phase, eluting at least one anionic degradation product using a mobile phase, and detecting the presence or absence of the at least one anionic degradation product. The presence of absence of the at least one anionic degradation product is indicative of the presence or absence of the chemical warfare agent.

In certain embodiments, the methods of the invention as described herein further comprise obtaining a weak anion exchange solid phase.

In yet another aspect, the invention provides a kit for purifying an anionic compound comprising a weak anionic exchange solid phase an instructions for the use in accordance with the methods of the invention described herein.

In a related aspect, the invention also provides a kit for analyzing a sample for the presence of an anionic compound comprising a weak anionic exchange solid phase and instructions for use in accordance with the methods of the invention described herein.

DETAILED DESCRIPTION OF THE INVENTION

Figure 1:
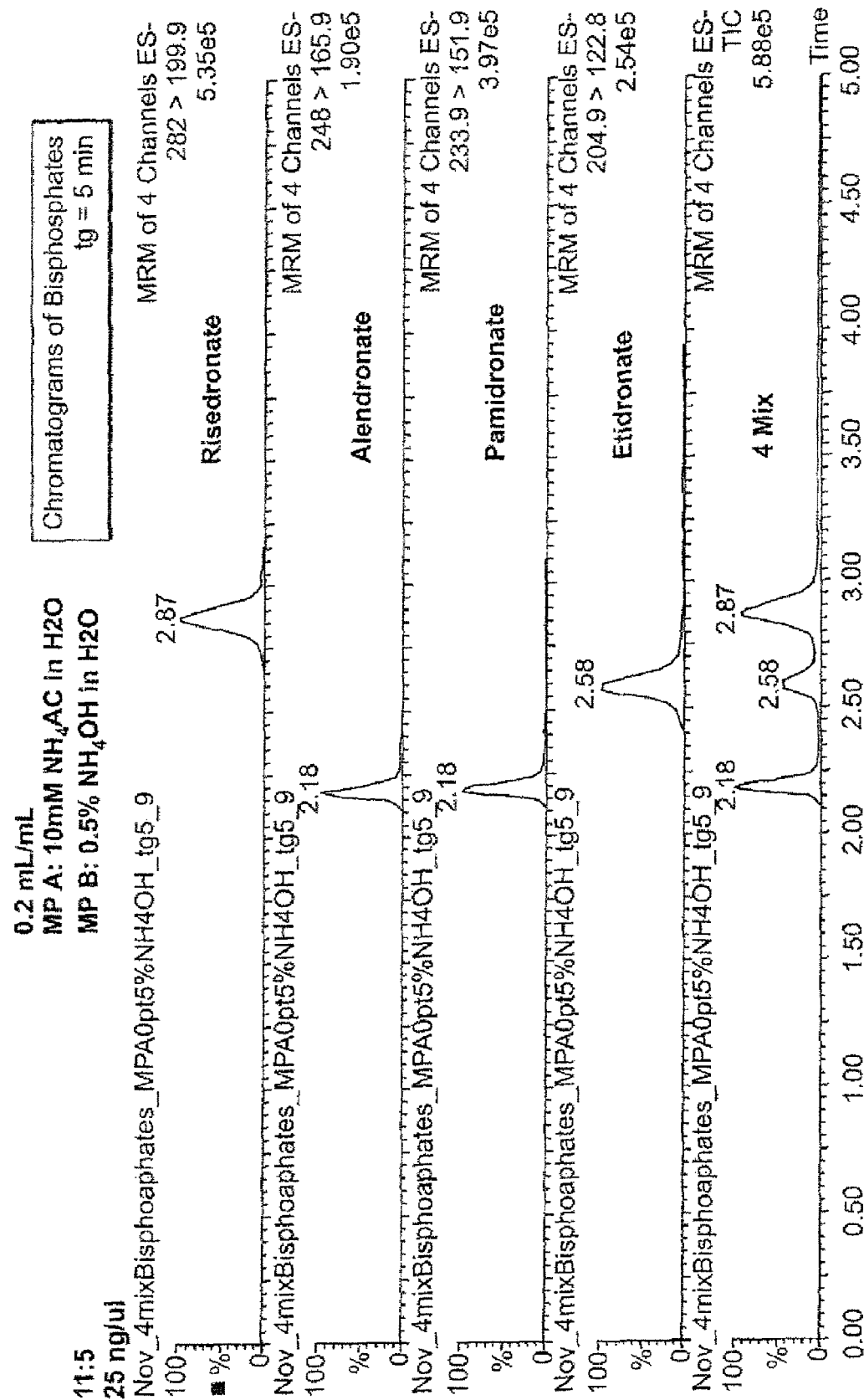
FIG. 1 shows an HPLC separation of bisphosphonates with mass spectrometric detection.

So that the invention may be better understood, certain terms are here defined.

An "anionic compound" is a compound that exists predominantly in a negatively-charged form (associated with a positively-charged counterion) at a high pH (a pH above 7) and exists in a neutral or positively-charged form at a low pH (a pH below 7). An anionic compound generally comprises at least one moiety or functional group capable of carrying a negative charge. In preferred embodiments, an anionic compound has a pKa of less than about 3, more preferably less than about 2 (e.g., relatively strong acids or polyacids). In the case of polyanionic compounds, the compound may have multiple pKas, of which at least one is preferably less than about 3, more preferably less than about 2. The pKa of a compound can be measured by methods known in the art, e.g., by use of aqueous titration methods. Commercially-available equipment can be used (e.g., instruments from Sirius Analytical Systems, East Sussex, UK). Examples of anionic compounds include phosphates, phosphonates, sulfates, sulfonates, carboxylates, nitrates, hydroxamates, and the like. A "polyanionic compound" is a compound which includes two or more anionic moieties capable of existing in negatively-charged form at a high pH (e.g., a pH above 7 or a pH above the pKa of the moieties).

The term "liquid chromatography" is art-recognized and includes chromatographic methods in which compounds are partitioned between a liquid mobile phase and a solid stationary phase. Liquid chromatographic methods are used for analysis or purification of compounds. The liquid mobile phase can have a constant composition throughout the procedure (an isocratic method), or the composition of the mobile phase can be changed during elution (e.g., a gradual change in mobile phase composition such as a gradient elution method).

The term "solid phase" is art-recognized and includes any solid phase useful for chromatographic separation or solid-phase extraction as described herein. A solid phase can be a resin (e.g., a polymer-based material), a hybrid organic/inorganic material, or other solid phase forms known to one of ordinary skill in the art. A solid phase can be in the form of, e.g., beads, pellets, or any other form desirable for use. The solid phase particles can have, e.g., a spherical shape, a regular shape or an irregular shape. Preferably, the particles are beads having a diameter in the range from about 3 to about 500 μm, preferably from about 20 to about 200 μm.

The term "weak anion exchange solid phase", as used herein, refers to a solid phase having the ability to act as a weak anion exchange material. A weak anion exchange material includes functional groups capable of ionic interaction with anions, e.g., the weak anion exchange material comprises positively-charged (cationic) groups at a pH of interest, e.g., a pH at which a sample or solution containing an anionic compound of interest is contacted with or loaded onto the weak anion exchange material. Further, the charge state of the weak anion exchange material should be different at a second pH; for example, at higher (more basic) pH, the anion exchange material has fewer positively-charged moieties than at lower pH. Thus, by changing the pH of an elution solvent, the charge state of the weak anion exchange resin can be altered.

The term "mobile phase" is art-recognized, and as used herein, refers to a liquid solvent system used to carry a compound of interest into contact with a solid phase (e.g., a solid phase in a solid phase extraction (SPE) cartridge or HPLC column) and to elute a compound of interest from the solid phase. Exemplary mobile phases include water, an aqueous solution, or a mixture of water or an aqueous solution and a water-miscible polar organic solvent, e.g., methanol, ethanol, N,N-dimethylformamide, dimethylsulfoxide or acetonitrile.

The term "pH" is art-recognized, and refers to a measure of the acidity or alkalinity of a compound in aqueous solution. While the pH of a compound in organic solvents may not be identical to the pH in aqueous solution, the term "pH" is used in reference to both aqueous and organic solutions unless otherwise stated.

The term "obtaining" as in obtaining a material, component or substance is intended to include buying, synthesizing, or otherwise acquiring the material, component or substance.

Methods of Purifying And/Or Detecting Anionic Compounds

In one aspect, the invention provides a method for purifying an anionic compound. The method includes the steps of contacting a mixture containing the anionic compound with a weak anion exchange solid phase under conditions such that the polyanionic compound is purified.

In certain embodiments, the anionic compound is selected from the group consisting of phosphates, phosphonates, and carboxylates, nitrates, and sulfates. In certain embodiments, an anionic compound can be, e.g., a peptide, protein, amino acid, amphoteric compound, or a degradation product of a chemical warfare agent, e.g., a phosphonate, including a phosphonate monoester. In certain embodiments the anionic compound in methylphosphonic acid or a monoester of methyl phosphonic acid such as ethyl methyl phosphonic acid (EMPA), isopropyl methyl phosphonate (IMPA), and pinacolyl methyl phosphonic acid (PMPA). In certain embodiments, herein the anionic compound is a bisphosphonate compound selected from alendronate, risedronate, etidronate, pamidronate, zoledronate, ibandronate, and clodronate. In certain embodiments, the anionic compound is a polyanionic compound, e.g., a bisphosphonate, bisphosphonate, triphosphate, and the like.

Figure 2:
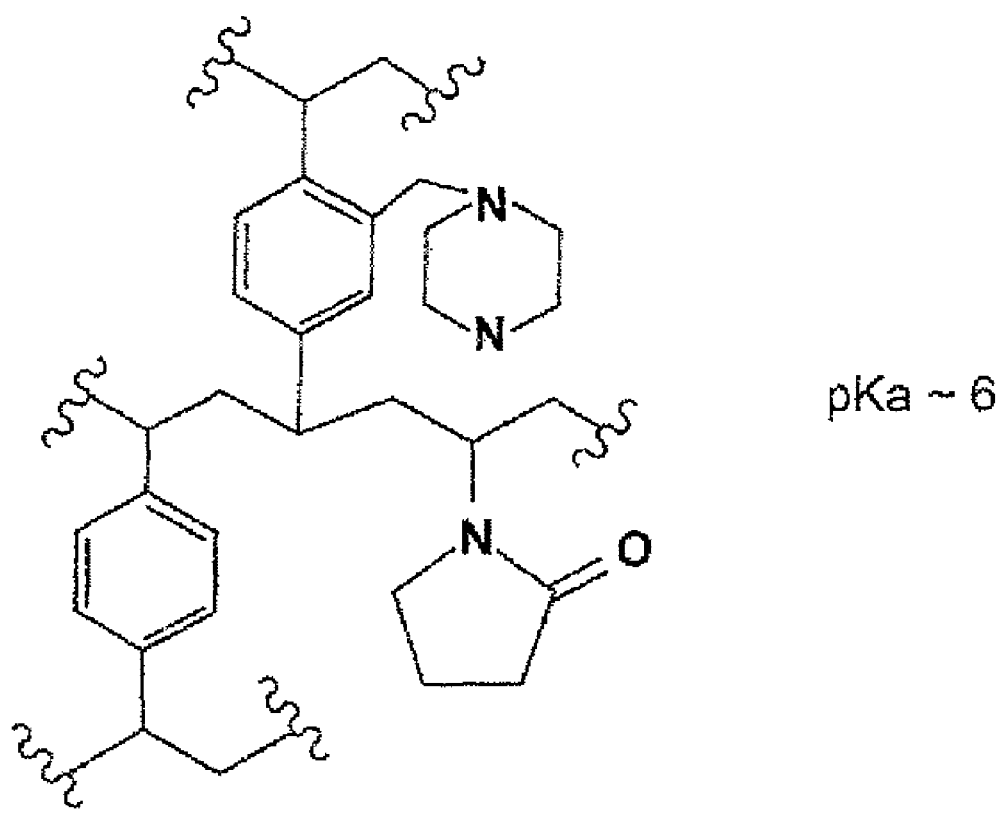
FIG. 2 shows the structure of the OASIS WAX sorbent.

The weak anion exchange material can be any material capable of weak anion exchange. In general, a weak anion exchange material will have a weakly basic functional group as part of the solid support. Examples of weak bases include primary, secondary, and tertiary amines. A particularly preferred amine functionality is a piperazinyl moiety. The solid support can be, e.g., a hybrid inorganic/organic hybrid material (see, e.g., U.S. Pat. No. 6,686,035 to Jiang et al.). In other embodiments, the solid support can be a polymeric material, e.g., a divinylbenzene/vinyl pyrrolidone copolymer. A preferred weak anion exchange solid support is a piperazinyl-substituted divinylbenzene/vinyl pyrrolidone copolymer sold under the tradename OASIS WAX (Waters Corp, Milford Mass.) (se FIG. 2 for the structure of the sorbent).

In certain embodiments, the solid support material can be used in columns, cartridges, or other formats. For example, in one embodiment, the weak anion exchange solid support material is packed as particles within an open-ended container to form a solid phase extraction cartridge. In other embodiments, the weak anion exchange solid support material is packed within a column to form an HPLC column. In certain embodiments, more than one type of solid support material can be used in the columns, cartridges, and the like of the present invention.

A suitable container for the weak anion exchange solid support material can be, e.g., a cylindrical container or column which is open at both ends so that the solution can enter the container through one end, contact the solid support within the container, and exit the container through the other end. The solid support can be packed within the container as small particles, such as beads having a diameter between about 3 μm and about 500 μm, preferably between about 20 μm and about 200 μm. In certain embodiments, the solid support particles can be packed in the container enmeshed in a porous membrane. In certain embodiments, the solid support is a porous monolith.

The container can be formed of any material which is compatible, within the time frame of the solid phase extraction or liquid chromatographic process, with the solutions and solvents to be used in the procedure. Such materials include glass and various plastics, such as high density polyethylene and polypropylene. In one embodiment, the container is cylindrical through most of its length and has a narrow tip at one end. One example of such a container is a syringe barrel. The amount of solid support within the container is limited by the container volume and can range from about 0.001 g to about 50 kg, and preferably is between about 0.025 g and about 1 g. The amount of solid support suitable for a given extraction depends upon the amount of solute to be sorbed, the available surface area of the solid support and the strength of the interaction between the solute and the solid support. This amount can be readily determined by one of ordinary skill in the art. The cartridge can be a single use cartridge, which is used for the treatment of a single sample and then discarded, or it can be used to treat multiple samples.

The anionic compound is generally provided as a solution or suspension in a liquid phase (e.g., a solvent). The solution or suspension can comprise water or an aqueous solution, or a water-miscible polar organic solvent, e.g., methanol, ethanol, N,N-dimethylformamide, dimethylsulfoxide or acetonitrile, or mixtures thereof. In certain embodiments, the solution or suspension is an acidic, basic or neutral aqueous, i.e., between about 1% and about 99% water by volume, solution. The solution comprising the solute (e.g., the compound of interest) can, optionally, further contain one or more additional solutes (which can be an impurity or impurities). In one embodiment, the solution is an aqueous solution which includes a complex variety of solutes. Solutions of this type include, e.g., blood, plasma, urine, cerebrospinal fluid, synovial fluid and other biological fluids, including, e.g., extracts of tissues, such as liver tissue, muscle tissue, brain tissue or heart tissue. Such extracts can be, e.g., aqueous extracts or organic extracts which have been dried and subsequently reconstituted in water or in a water/organic mixture. Solutions also include, e.g., ground water, surface water, drinking water or an aqueous or organic extract of an environmental sample, such as a soil sample. Other examples of solutions include a food substance, such as a fruit or vegetable juice or milk or an aqueous or aqueous/organic extract of a food substance, such as fruit, vegetable, cereal or meat. Other solutions include, e.g., natural products extractions from plants and broths.

The solution or suspension containing the compound (or compounds) of interest can be contacted with the weak anion exchange solid support material in any fashion which allows sorption of the solute to the solid support, such as a batch or chromatographic process. For example, the solution or suspension can be forced through a column, disk or plug, or the solution can be stirred with the weak anion exchange solid support material, such as in a batch-stirred reactor. In certain embodiments, the solution or suspension can be filtered or otherwise treated to remove excess particulate matter prior to contact with the anion exchange solid support. The solution can also be added to a well of a microtiter plate in which the anion exchange solid support has been placed. The solution or suspension is contacted with the solid support for a time period sufficient for the solute (e.g., the anionic compound) of interest to substantially sorb onto the solid support. This period is typically the time necessary for the solute to equilibrate between the solid support surface and the solution. The sorption or partition of the solute onto the solid support can be partial or complete.

The compound of interest can be analyzed or purified by elution from the solid support using a mobile phase. The mobile phase can be an aqueous mobile phase, an organic mobile phase, or a mixture of aqueous and organic solvents. A mobile phase can contain additives, such as buffers or other pH-modifying additives.

In a preferred embodiment, the method includes the steps of contacting the mixture containing the anionic compound with a weak anion exchange solid phase; separating at least one impurity from the anionic compound by eluting the impurity with a solvent having a first pH; and eluting the anionic compound from the weak anion exchange solid phase with a solvent having a second pH. The first and second pHs are selected such that the anionic compound of interest is substantially retained on the solid phase at the first pH (thereby becoming sorbed onto the solid support), and is substantially non-retained at the second pH (thereby being eluted from the solid support). By appropriate selection of mobile phases, impurities can be separated from the compound of interest. For example, once the compound of interest is sorbed onto the solid support, washing of the solid support with a mobile phase at low pH can remove neutral (uncharged) impurities while retaining the compound of interest. By then using a mobile phase having a higher pH (thereby preferably altering the charge state of the solid support, vide infra), the compound of interest can be eluted in a purified form.

In preferred embodiments, the first pH is in the range of 1 to 6, more preferably 2 to 5. In preferred embodiments, the second pH is in the range of 6-14, more preferably 7-11. In preferred embodiments, the difference between the first pH and the second pH is at least 2 or 3 pH units; e.g., if the pH of the first mobile phase is 2.5, then the pH of the second mobile phase can be at least 5.5; or, if the first mobile phase has a pH of about 5, then the second mobile phase can have a pH of about 7. In certain embodiments, the pH difference is at least about 4 pH units, 5 pH units or 6 pH units. The pH of one mobile phase can be, e.g., between 2 and 5, while the pH of another mobile phase can be, e.g., at least 3 pH units greater, e.g., between 5 and 8, or 5 and 10, or 7 and 12. In certain preferred embodiments (e.g., where a solid support such as OASIS WAX is employed), the solid support can be equilibrated with a mobile phase having a pH of about 5. The pH of the first mobile phase and second mobile phase are preferably selected to provide substantially a first charge state of the solid support, and the second mobile phase is selected to provide a second charge state of the solid support. By providing first and second charge states for the solid support, the retention of anionic compounds can be altered. One of ordinary skill in the art can readily determine suitable first and second Phs for use with a selected solid support and anionic compound of interest, in view of the teachings herein.

In certain preferred embodiments, the mobile phase is substantially free of non-volatile salts. In certain preferred embodiments, the mobile phase comprises less than about 20 mM (more preferably less than 10 or 5 mM) non-volatile salts. In certain preferred embodiments, the mobile phase contains less than about 20 mM of volatile salts.

The term "non-volatile salts", as used herein, refers to salts present in the mobile phase which are substantially non-volatile under conditions used for removing mobile phase solvents when interfacing a liquid chromatography system with a mass spectrometer. Thus, salts such as sodium chloride or potassium phosphate are considered non-volatile salts, whereas salts such as ammonium formate, ammonium bicarbonate, or ammonium acetate, which are largely removed under vacuum, are volatile salts. Other volatile salts can be used, as will be apparent to one of ordinary skill in the art. For example, ammonium ($NH_4^+$) salts of volatile acids (e.g., formic acid, acetic acid, trifluoroacetic acid, perfluorooctanoic acid) are generally volatile salts suitable for use with MS detection.

In another aspect, the invention provides a method for analyzing a sample for the presence of an anionic compound. The method includes the steps of contacting a mixture containing the anionic compound with a weak anion exchange solid phase; eluting the anionic compound using a mobile phase; and detecting the presence and/or concentration of the anionic compound.

In certain preferred embodiments, the detecting step comprises detecting the anionic compound using a mass spectrometer. In certain preferred embodiments, the mobile phase pH is adjusted in a gradient from low pH to high pH to elute the anionic compound from the weak anion exchange solid phase.

The invention also includes a method for analytically determining the level of solute (e.g., an anionic compound) in a solution. A solution having a solute is contacted with a weak anion exchange solid support under conditions so as to allow sorption of the solute to the solid support. The solid support having the sorbed solute is washed with a solvent under conditions so as to desorb the solute from the solid support. The level of the desorbed solute present in the solvent after the washing is analytically determined.

The level of the desorbed anionic compound present in the solvent can be analytically determined by a variety of techniques known to those skilled in the art, e.g., high performance liquid chromatography, gas chromatography, liquid or gas chromatography/mass spectrometry, or immunoassay. In preferred embodiments, the detection is by mass spectrometry.

The solution contacted with the solid support can comprise the solute of interest in dilute form, e.g., at a concentration too low for accurate quantitation. By sorbing the solute onto the solid support and then, e.g., desorbing the solute with a substantially smaller volume of a solvent, a solution which includes the solute of interest can be prepared having a substantially higher concentration of the solute of interest than that of the original solution. The method can also result in solvent exchange, that is, the solute is removed from a first solvent and re-dissolved in a second solvent.

Solvents which are suitable for desorbing the solute from the solid support can be, e.g., polar water-miscible organic solvents, such as alcohols, e.g., methanol, ethanol or isopropanol, acetonitrile, acetone, and tetrahydrofuran, or mixtures of water and these solvents. A suitable solvent can be determined by one of ordinary skill in the art without undue experimentation, as is routinely done in chromatographic methods development (see, e.g., McDonald and Bouvier, eds., Solid Phase Extraction Applications Guide and Bibliography, "A Resource for Sample Preparation Methods Development," 6th edition, Waters, Milford, Mass. (1995); Snyder and Kirkland, Introduction to Modern Liquid Chromatography, New York: J. Wiley and Sons (1974)).

In still another aspect, the invention for detecting the presence or absence of phosphonate-based compounds, including biologically active compounds such as chemical warfare agents (e.g., nerve gases or nerve agents), or degradation products thereof. The method includes the steps of contacting a sample which contains or may contain a phosphonate-based compound, including a biologically active compound such as a chemical warfare agent, or at least one anionic degradation product thereof, with a weak anion exchange solid phase, eluting at least one anionic degradation product using a mobile phase; and detecting the presence or absence of the at least one anionic degradation product. The presence or absence of the at least one anionic degradation product is indicative of the presence or absence of the chemical warfare agent. In certain embodiments, the chemical warfare agent is a phosphonate or phosphonate ester (e.g., a phosphonate mono- or di-ester). If the chemical warfare agent is not itself an anionic compound, a degradation product (e.g., the product of hydrolysis of the chemical warfare agent) which is an anionic compound, may be detected as an indicator of the presence or absence of the chemical warfare agent. In certain preferred embodiments, the chemical warfare agent is VX, Sarin, or Soman.

EXAMPLES

The invention provides a novel and simple LC/MS/MS method using a hybrid weak anion exchange HPLC packing material. A gradient from low to high pH can be used. A low pH starting gradient solution ensures that the analyte will be retained by ion exchange (i.e. the sorbent is charged). A pH gradient to high pH then "turns off" the ion exchange function and the analytes are eluted from the column. The mobile phase can be MS compatible. The LC/MS/MS conditions can be optimized by experimenting with different starting gradient solutions and pHs, ending gradient solution elution strength, flow rates, and organic concentrations. Linear calibration curves have been obtained for LC/MS/MS analysis of anionic analytes (e.g., risedronate) over a concentration range of 0.5 to 100 ng/µL.

The present invention also provides a simple and straightforward SPE method using a weak anion exchange SPE sorbent. The SPE method works for both aqueous and biological matrices. Recoveries are often over 80%.

Example 1

SPE Clean-Up of Rat Plasma Samples

Rat plasma samples were spiked with 50 pg/µl of a model analyte (camphorsulfonic acid), then diluted and acidified with an equal volume of 2% phosphoric acid solution. An Oasis WAX µElution plate (Waters Corp., Milford Mass.) was equilibrated with 200 µl of methanol and 200 µl water, then loaded with 100 µl of the spiked, diluted rat plasma. The plate was washed with 200 µl of 2% formic acid (pH 2.7), then washed with 200 µl of methanol. The analyte was eluted with 50 µl of 2% ammonium hydroxide in methanol, and the eluent was diluted with 50 µl of 2% formic acid before analysis.

Mass spectrometric analysis (Waters Micromass Quattro premier, ESI mode) of the resulting samples demonstrated a mass recovery of greater than 100% when camphorsulfonic acid was used as the anionic compound of interest.

Example 2

Bisphosphonates are widely used for the treatment and prevention of bone disorders and diseases of bone metabolism. These highly charged acidic compounds can be difficult to analyze.

An Oasis WAX LC column (2.1×20 mm, 5 µm particles) was used for analysis of bisphosphonates. Solvent A: 10 mM ammonium acetate in 20% methanol/80% water; solvent B: 2% ammonium hydroxide in 20% methanol/80% water; flow rate: 0.2 ml/min. Gradient: Time 0.0 min: 100% A; 3.0 min: 100% B; 3.4 min: 100% B; 3.5 min: 100% A; 5.0 min: 100% A. Better responses were obtained when new columns were pre-conditioned by running several injections (up to about 20) prior to use. An injection volume of 10 µl was used (typically containing between 5 and 1000 ng per injection). A Waters 2777 Sample manager and 1525µ Binary HPLC pump were employed. MS detection was performed with a Waters Micromass Quattro Premier instrument in ESI negative mode. The test compounds were risedronate, alendronate, pamidronate, etidronate, and a mixture of these four bisphosphonates.

The results of the HPLC separation are shown in FIG. 1. As shown in FIG. 1, alendronate and pamidronate are not well separated under these conditions, but risedronate and etidronate are separated from the remaining bisphosphonates and are readily detected by MS under these conditions. It was found that the separation of bisphosphonates can be improved by appropriate selection of mobile phase composition; for example, these compounds are not well resolved in a system in which Mobile Phase A was 100 mM ammonium acetate in water and Mobile Phase B was 2% ammonium hydroxide in water, but were better resolved where Mobile Phase B was changed to 0.5% ammonium hydroxide in water. Also, the use of ammonium acetate in Mobile Phase A gave better results than using pure water for Mobile Phase A. In addition, it has been found that detection sensitivity can be increased by using 20% methanol in the mobile phase compared to a 100% water mobile phase.

Example 3

In this Example, rat plasma was spiked with bisphosphonates to determine whether these compounds could be recovered from a model of a biological fluid matrix.

Rat plasma samples were spiked with 50 ng/µl of a model analyte (risedronate), then diluted with an equal volume of 10 mM ammonium acetate in water (adjusted to pH 5 with acetic acid). A 96-well Oasis WAX µElution plate (Waters Corp., Milford Mass.) was conditioned with 200 µl of methanol and equilibrated with 200 µl of 10 mM ammonium acetate in water (pH 5), then loaded with 100 µl of the spiked, diluted rat plasma. The plate was washed with 200 µl of 5% methanol in water, then washed with 200 µl of 20% methanol in water. The analyte was eluted with 200 µl of 5% ammonium hydroxide in 20% methanol/80% water (in two portions of 100 µl), and the eluent was dried and then reconstituted with 100 µl of water for analysis (10 µl injection volume).

Mass spectrometric analysis (Waters Micromass Quattro premier, ESI negative mode) of the resulting samples demonstrated a mass recovery of 80% and 91.5% (except when the plate was overloaded) when risendronate acid was used as the anionic compound of interest.

Example 4

In this Example, degradation products of chemical warfare reagents are analyzed using an Oasis WAX LC column.

Figure 3:
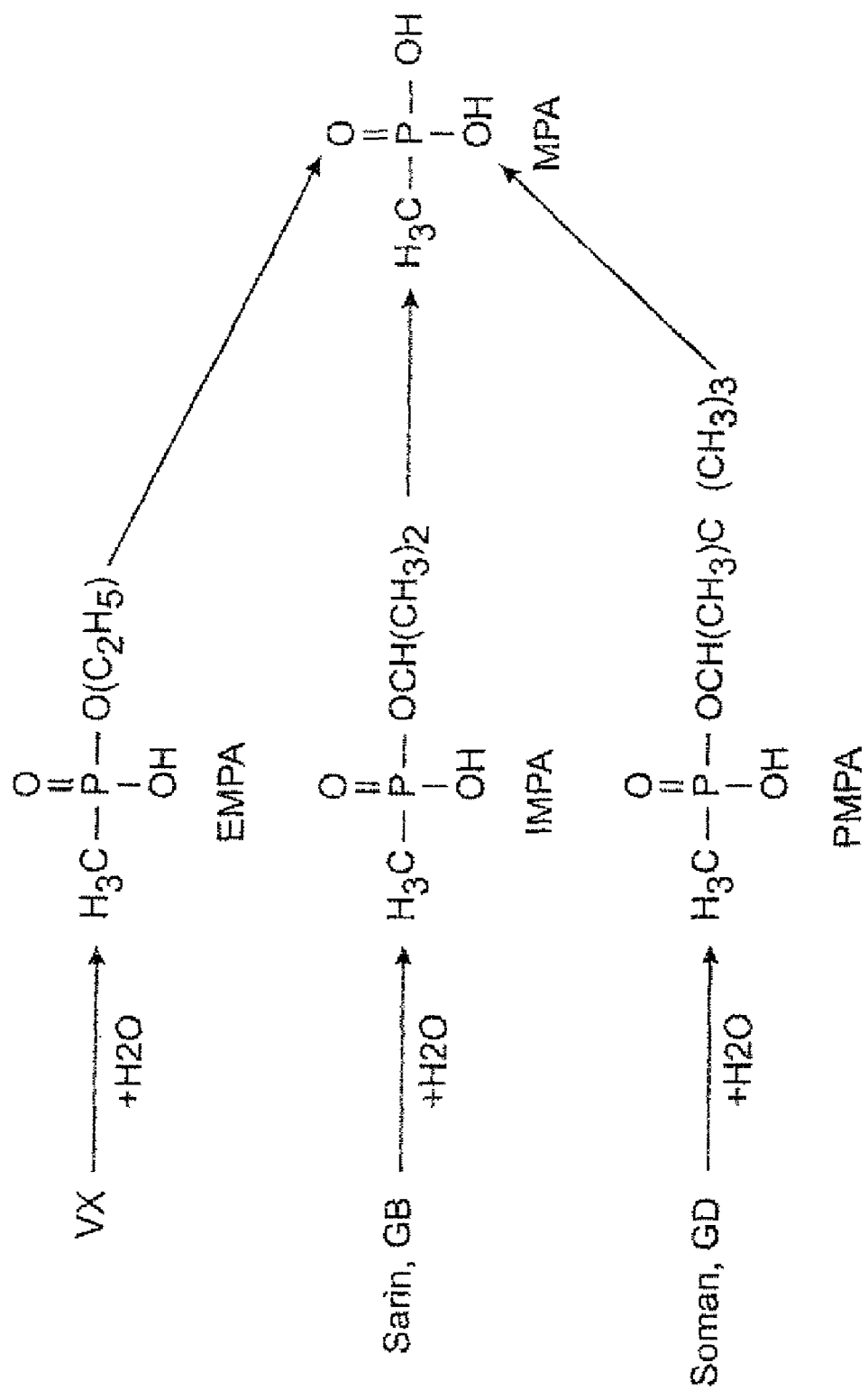
FIG. 3 shows hydrolytic decomposition of chemical warfare agents yielding methylphosphonic acid (MPA).
Figure 4:
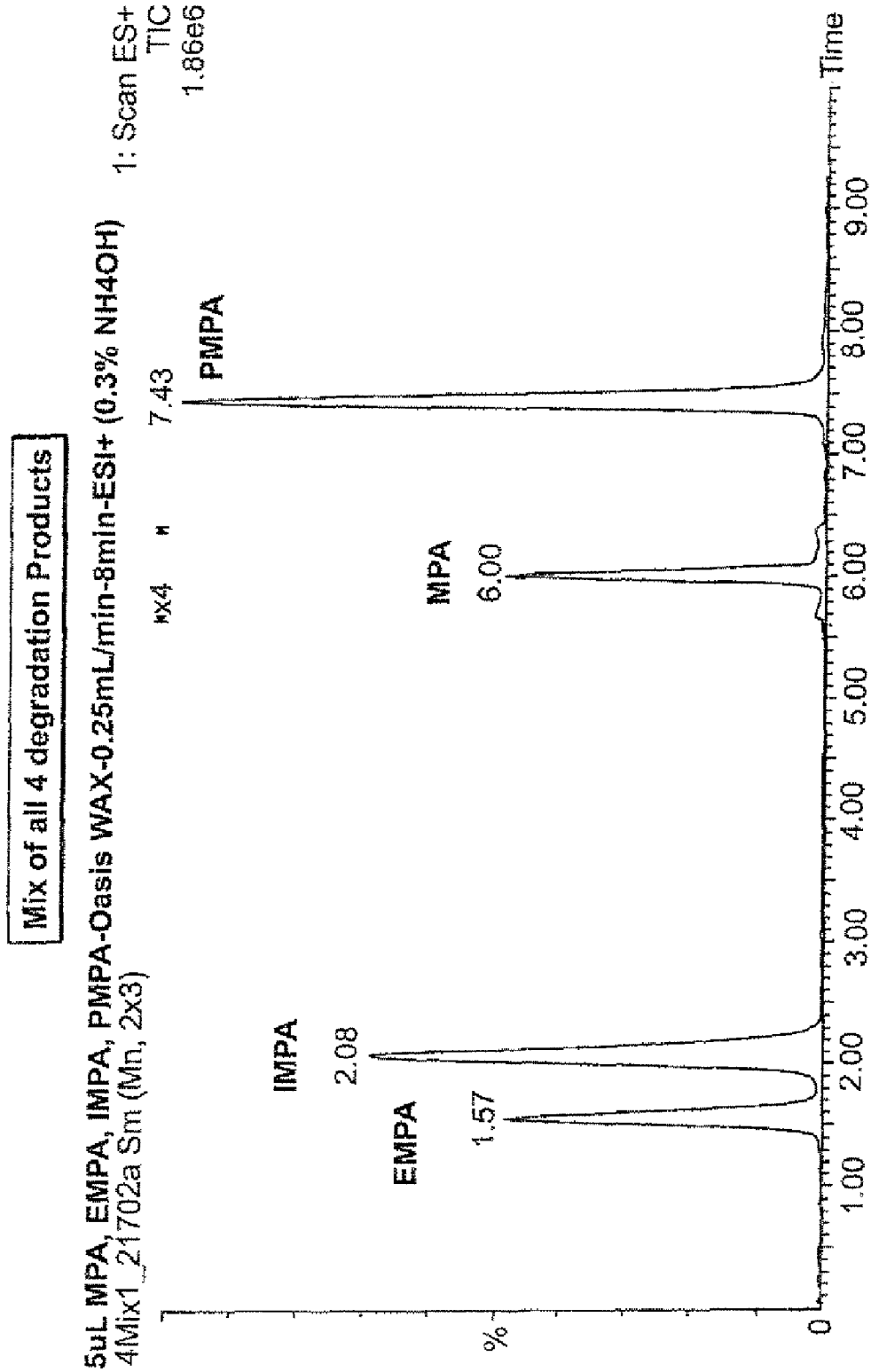
FIG. 4 shows an HPLC separation of degradation products of chemical warfare agents with mass spectrometric detection.

FIG. 3 shows the structures of certain phosphonate degradation products of chemical warfare agents. These products are methyl phosphonic acid (MPA), ethyl methyl phosphonic acid (EMPA), isopropyl methyl phosphonate (IMPA), and pinacolyl methyl phosphonic acid (PMPA). EMPA is a product of the degradation of Sarin (also known as GB); PMPA is a product of the degradation of Soman (also known as GD); MPA is a degradation product of all these chemical warfare agents. These compounds can be separated on an OASIS WAX LC column using as Mobile Phase A 10 mM ammonium acetate with 5% methanol, and as Mobile Phase D 0.3% ammonium hydroxide in water with 20% methanol; the flow rate is 0.25 mL/min. Compounds are detected by ESI+MS.

It is found that MPA, EMPA, IMPA, and PMPA can be separated and detected using this system.

Example 5

This example features a determination of bisphosphonates in plasma and urine with the model phosphonate, alendronate. This method features a derivatization of the phosphonate. The hydroxyl groups of the phosphate are methylated and the $NH_2$ functional groups are transformed into quarternary amines.

Rat plasma samples and rat urine samples, 0.6 ml plasma or urine were spiked with an internal standard, 60 µL of 25 ng/ml $d_6$-alendronate, then diluted to 2 ml and adjusted to a pH of 4 using 20 mM HCl solution and water. OASIS® WAX 6 cc/150 mg Cartridges (Waters Corporation, Milford, Mass.) were conditioned 2000 µL 100% methanol, equilibrated with 2000 1 µL 20 mM HCl followed by 2000 µL water operating on a manifold under vacuum.

An aliquot of the sample, 0.5 ml, were placed in the cartridges and vacuum slowly increased. The samples were washed with 2000 µL 20 mM HCl, followed by 2000 µL 100% methanol. The vacuum was turned off as the last sample ran dry.

A solution of 3:1:0.25 (v/v/v) methanol:trimethylsilil (TMS)-diazomethane:water was prepared. A first elution of 1000 µL of TMS-diazomethane solution, a second elution of 1000 1 µL of TMS-diazomethane solution was passed dropwise through the cartridges, followed by a third elution of 1000 µL 100% methanol. Collection tubes are lightly covered with foil and allowed to stand at room temperature for thirty minutes to complete the reaction. The collection tubes are next placed in a nitrogen evaporator at 40° centigrade and evaporated to dryness. The reaction product is reconstituted with 100 μL of 2% formic acidin 75/25 ACN/methanol, and transferred to LC/MS vials.

The reaction product is transferred to a ACQUITY HPLC® system equipped with an ACQUITY HPLC® BEH 2.1×100 mm, 1.7 μm column (Waters Corporation, Milford, Mass.). Operating with a gradient of 95% solution A and 5% solution B, to 5% solution A to 5% solution B over a five to six minute period at a flow rate of 0.4 ml/minute the derivatized alendronate is isolated. Solution A comprised 100% acetonitrile. Solution B comprised 150 mM ammonium formate buffer PH 3.5 in water.

The reaction product has a retention time of 2.9 minutes +/−0.5 minutes and is preferably detected by mass spectrometry such as Waters Quattro Premier™ XE with electrospray positive source (Waters Corporation, Milford, Mass.).

INCORPORATION BY REFERENCE

The contents of all references (including literature references, issued patents, published patent applications, co-pending patent applications) cited throughout this application are hereby expressly incorporated herein in their entireties by reference.

EQUIVALENTS

Those skilled in the art will recognize, or be able to ascertain using no more than routine experimentation, many equivalents of the specific embodiments of the invention described herein. Such equivalents are intended to be encompassed by the following claims.

What is claimed is:

1. A method for purifying an anionic compound, the method comprising contacting a mixture containing the anionic compound with a weak anion exchange solid phase under conditions such that the anionic compound is purified or derivatized, wherein the weak anion exchange solid phase comprises a solid support having a vinylpyrrolidone based sorbent comprising piperazinyl pendant groups.

2. The method of claim 1, wherein the anionic compound is selected from the group consisting of phosphates, phosphonates, and carboxylates, nitrates, and sulfates.

3. The method of claim 1, wherein the anionic compound is a bisphosphonate compound selected from alendronate, risedronate, etidronate, pamidronate, zoledronate, ibandronate, and clodronate.

4. The method of claim 1, wherein the anionic compound is a polyanionic compound.

5. The method of claim 1, wherein the weak anion exchange solid phase is an organic/inorganic hybrid material.

6. The method of claim 1, wherein the anionic compound is eluted from the weak anion exchange solid phase using a solvent.

7. The method of claim 6, wherein the solvent comprises an organic solvent.

8. The method of claim 1, wherein the weak anion exchange solid phase is a solid-phase extraction sorbent.

9. The method of claim 1, wherein the weak anion exchange solid phase is a packing for a liquid chromatographic column.

10. The method of claim 1, wherein the method comprises:
a) contacting the mixture containing the anionic compound with a weak anion exchange solid phase;
b) separating at least one impurity from the anionic compound by eluting the impurity with a solvent having a first pH; and
c) eluting the anionic compound from the weak anion exchange solid phase with a solvent having a second pH.

11. The method of claim 1 wherein said anionic compound is derivatized to form a derivatized product.

12. The method of claim 11 wherein said derivatized product is isolated by chromatography to form an isolated product.

13. The method of claim 12 isolated product is identified by mass spectrometry.

* * * * *